US006567876B1

(12) United States Patent
Stufflebeam

(10) Patent No.: US 6,567,876 B1
(45) Date of Patent: May 20, 2003

(54) DOCKING PCI TO PCI BRIDGE USING IEEE 1394 LINK

(75) Inventor: Ken Stufflebeam, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/454,957

(22) Filed: Dec. 3, 1999

(51) Int. Cl.[7] .............................................. G06F 13/00
(52) U.S. Cl. ...................................... 710/303; 710/300
(58) Field of Search .............................. 710/300, 301, 710/302, 303, 304

(56) References Cited

U.S. PATENT DOCUMENTS

| | | | | |
|---|---|---|---|---|
| 5,875,307 A | * | 2/1999 | Ma et al. ..................... | 710/304 |
| 5,916,287 A | * | 6/1999 | Arjonmand et al. .......... | 701/29 |
| 6,161,157 A | * | 12/2000 | Tripathi et al. ............. | 710/109 |
| 6,202,103 B1 | * | 3/2001 | Vonbank et al. ............. | 710/15 |
| 6,226,700 B1 | * | 5/2001 | Wandler et al. ............. | 710/101 |

\* cited by examiner

*Primary Examiner*—Rupal Dharia
*Assistant Examiner*—Tim Vo

(57) ABSTRACT

A computer system and associated docking station couple via PCI bus signals and sideband signals using a hot pluggable serial bus between a pair of PCI bridges, one bridge located in the computer, and one bridge located in the dock. The hot pluggable bus preferably comprises an IEEE 1394 serial bus. Each bridge captures the state of the PCI bus during selected PCI cycles and transmits the bus values to the other bridge over the IEEE 1394 bus. The bridge that receives the PCI values drives its own PCI bus with the values captured on the other PCI bus, thus performing the duties of a conventional PCI-to-PCI bridge. The docking bridges exchange sideband signals in a similar manner over the IEEE 1394 bus.

25 Claims, 5 Drawing Sheets

Fig. 1 [Prior Art]

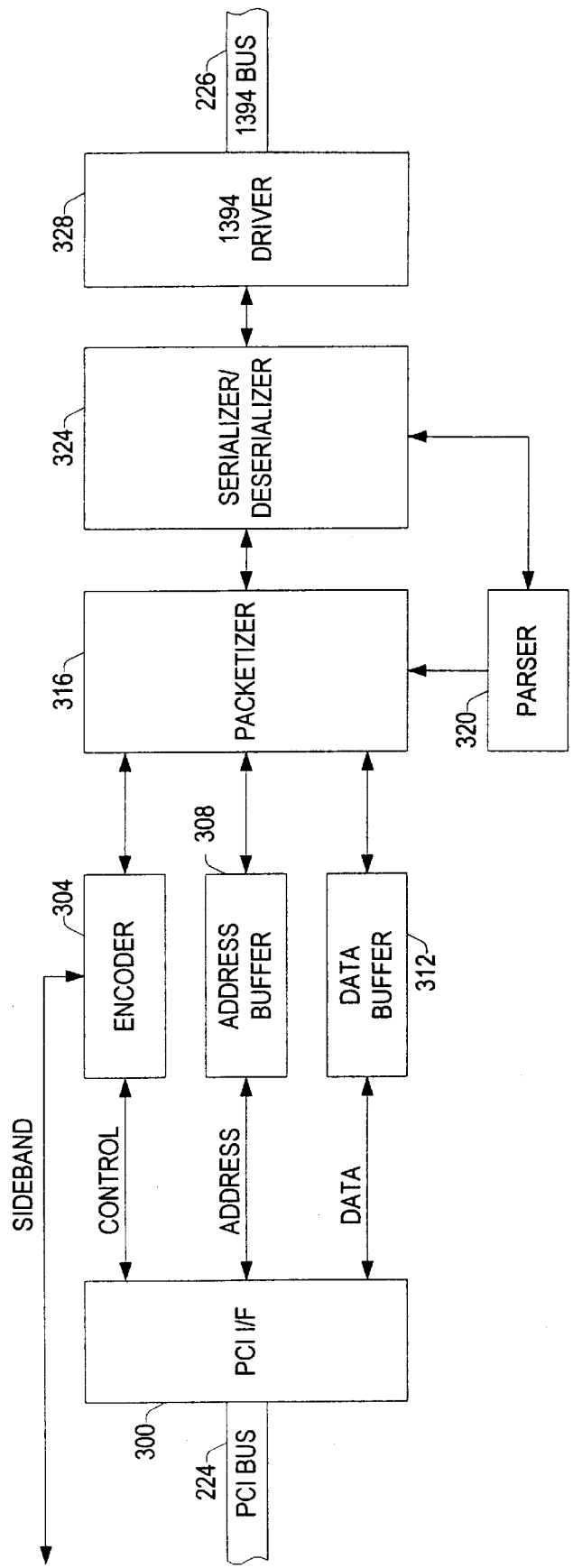

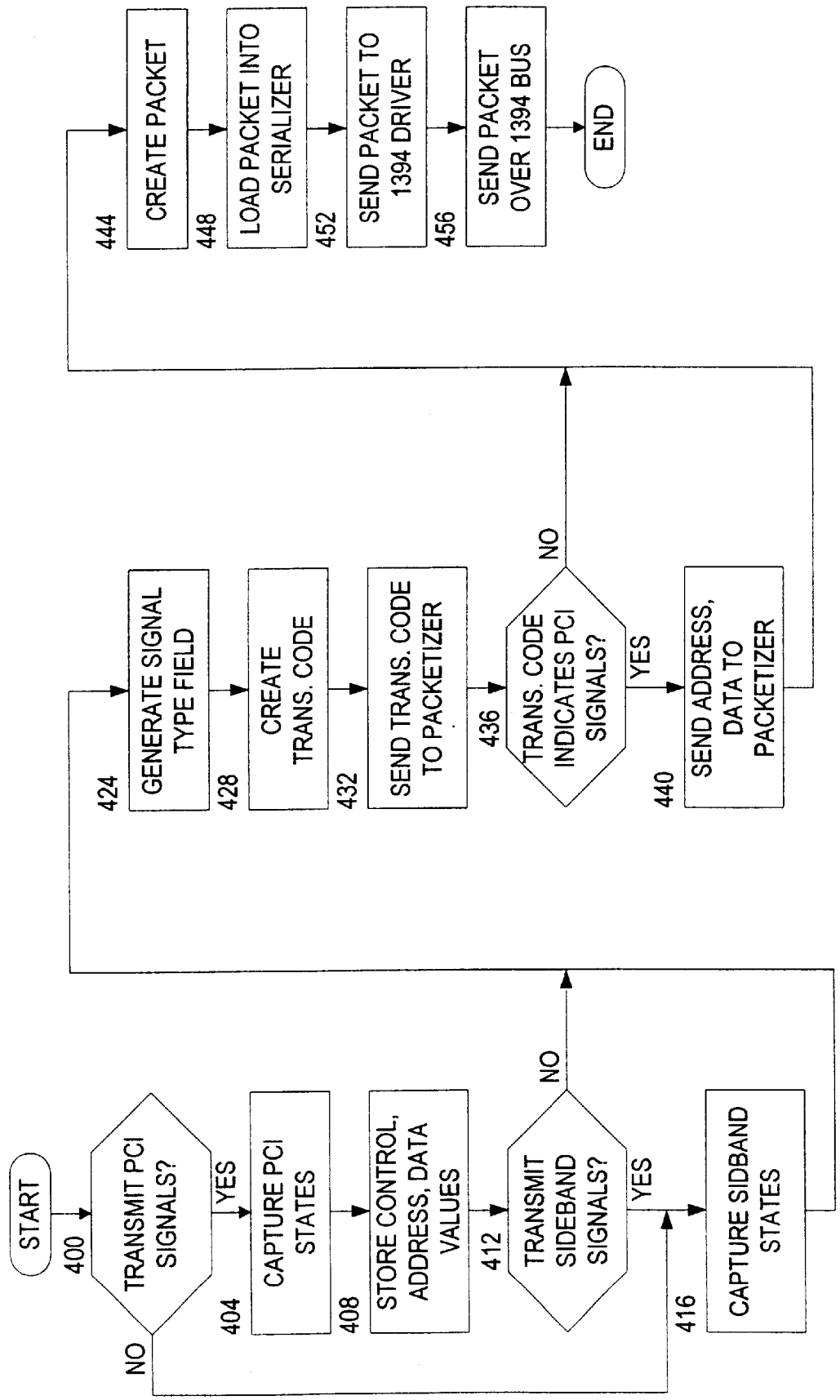

DOCKING PCI TO PCI BRIDGE USING IEEE 1394 LINK

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates generally to docking of personal computer systems and particularly to a bus bridge that facilitates "hot" docking. More particularly, the present invention relates to an enhanced expansion bus bridge for attaching a computer system to a docking station without requiring the computer system to shut down or enter sleep mode during the docking sequence.

BACKGROUND OF THE INVENTION

Many portable computer systems are capable of connecting to a docking station, or an expansion base. The docking station is not actually a part of the portable computer system per se, but instead comprises a separate unit that accommodates the computer. The portable computer electrically connects to the docking station usually by way of an expansion bus, such as a Peripheral Component Interconnect (PCI) or other suitable bus. Because of inherent size and weight restrictions, portable computers tend to require design tradeoffs such as small keyboards and graphics displays, crude cursor control devices, and a limited number of mass storage devices. The docking station (or simply "dock") usually couples to peripheral devices, such as a CD ROM drive, a standard size keyboard, and a large monitor and thus converts the portable computer into a desktop system. Accordingly, the computer user can access valuable features such as additional peripheral components including a large graphics display, a full-size mouse and keyboard, hard and floppy disk drives, CD ROM drives, Digital Video Disc (DVD) drives, and other peripheral components. An expansion base may also offer connections to a local area network (LAN), printer, and modem. Although intended primarily for desktop operation, the utilization of expansion bases has greatly enhanced the usability and comfort of laptop computer systems, handheld computers, and other portable systems, especially when the computer is used frequently in one location, such as in the home or office.

When the portable computer is docked, an expansion bus within the computer typically couples to an expansion bus in the docking station. The expansion bus permits communication (e.g., data transfers) between the computer and a peripheral device in the docking station. Because of the delicate nature of high performance expansion buses such as the PCI bus, care must be taken when designing a docking system and implementing the docking procedure to connect two PCI buses. One factor to consider is that a single expansion bus often can only support a limited number of components. Suddenly "loading" an expansion bus with too many components may severely degrade performance or crash the bus. To facilitate docking in portable computer systems, bus "bridge" devices have been developed that couple the expansion bus within the computer to the expansion bus inside the docking station. Because the computer expansion bus and dock expansion bus are not directly connected to one another, neither expansion bus becomes overloaded due to the docking connection.

FIG. 1 illustrates a representative conventional computer system/docking station configuration. The computer 100 generally includes a CPU coupled to a bridge logic device via a CPU bus. The bridge logic device is sometimes referred to as a "North bridge" for no other reason than it often is depicted at the upper end of a computer system drawing. The North bridge also couples to a main memory array by a memory bus. The North bridge couples the CPU and memory to the peripheral devices in the system through a PCI bus 125 or other expansion bus (such as an EISA bus). Various components that implement the PCI protocol may reside on the computer's PCI bus 125, such as a graphics controller.

If other secondary expansion buses are provided in the computer system, another bridge logic device typically is used to coupled the PCI bus 125 to that expansion bus. This bridge logic is sometimes referred to as a "South bridge," reflecting its location vis-à-vis the North bridge in a typical computer system drawing. In FIG. 1, the South bridge couples the computer PCI bus 125 to an ISA bus. Various ISA-compatible devices are shown coupled to the ISA bus.

The South bridge may also support an input/output (I/O) controller that interfaces to basic input/output devices (not shown) such as a keyboard, a mouse, a floppy disk drive, and various input switches such as a power switch and a suspend switch. The I/O controller typically couples to the South bridge via a standard bus, shown as an ISA bus in FIG. 1. A low speed serial bus (not shown), which generally is a bus with only one data signal, may provide an additional connection between the I/O controller and South bridge. The I/O controller typically comprises an ISA bus interface (not specifically shown) and transmit and receive register (not specifically shown) for exchanging data with the South bridge over the serial bus.

The I/O controller generally has the capability to handle power management functions such as reducing or terminating power to components such as the floppy drive (not shown), blocking the clock signals that drive components such as the bridge devices and CPU, and initiating sleep mode in the peripheral buses. The I/O controller further assert System Management Interrupt (SMI) signals to various devices such as the CPU and North bridge to indicate special conditions pertaining to input/output activities such as sleep mode. The I/O controller typically incorporates a counter or a Real Time Clock (RTC) to track the activities of certain components such as the hard drive and the PCI bus 125, inducing a sleep mode or reduced power mode after a predetermined time of inactivity. The I/O controller may also place the computer system into a low-power mode, in which the power to all devices except the I/O controller itself shuts off completely.

The computer system also includes a bus bridge for coupling the expansion bus within the computer to an expansion bus housed in a docking station. A typical docking station 150 with a PCI bus 175 is pictured in FIG. 1 and coupled to the PCI bus 125 within the computer system. As shown, a PCI-to-PCI bus bridge device 130 couples the two PCI buses 125 and 175. An exemplary PCI-to-PCI bridge device is the 21554 PCI-to-PCI bridge manufactured by Intel Corporation.

The docking station 150 pictured in FIG. 1 also includes a South bridge logic (not shown specifically) for coupling components connected to the computer's PCI bus 125 to other components contained within the docking station 150. Thus, as shown in FIG. 1, a South bridge logic device within the docking station couples the PCI bus 125 to various expansion buses including an ISA bus, a universal serial bus (USB), and an integrated drive electronics (IDE) bus. The docking station 150 also supports a local area network (LAN) connection such as Ethernet. In addition to the PCI signals that are provided between the computer 100 and the dock 150, various "sideband" within the docking station 150 must be connected to the computer system 100 during docking. These sideband signals typically connected I/O controller but may be connected to virtually any component within the computer. Examples of sideband signals include power and ground signals, interrupt signal, and I/O signals such as serial and parallel port signals, keyboard and mouse signals, and audio and video signals. Accordingly, the South Bridge logic in the docking station 150 may include dedicated I/O controllers coupled to the I/O devices and that transmit the sideband signals.

A significant problem inherent in docking relates to electrical "transients" and voltage mismatches that can occur when the connectors on the computer 100 and docking station 150 are first mated. When the opposing connectors first meet, a slight but rapid "bouncing" action may occur between the electrical contacts on the connector, causing the contacts to repeatedly connect and then disconnect. When opposing contact are engaged, electric current may flow through the connection. When the opposing contacts are separate, the electric current is stopped. Thus, bouncing connectors cause intermittent current flow. In addition to the bouncing problem, differences in reference voltage levels (i.e., ground levels) between the computer and docking station can produce current "spikes," or large inrushes of current, when the connectors are mate. Current spikes are highly undesirable and can cause component damage and reduce battery life. Virtually all of the signals that connect the computer system to the docking station, including expansion bus signals and also sideband signals, are susceptible to electrical transients and voltage spikes during the docking procedure.

In order to avoid transient problems, early computer designs required shutting off the computer system before docking, a procedure known as "cold docking." Although shutting off the computer effectively prevents the undesirable electrical problems described above, the user must power on the computer after docking and endure a lengthy and annoying reboot sequence before the computer can be used.

Recent computer systems have been capable of safely docking without completely powering down by implementing a variety of power modes, each of which may draw a different amount of electric power, depending on the state. Aside from the familiar "normal" and "power off" modes, in which the computer is running at full power or is turned off, other power modes include the low-power "suspend" and "sleep" modes. These low-power modes generally allow the computer to operate at a reduced level of power, albeit with reduced functionality.

During suspend mode, certain hardware devices which tend to draw large amounts of power, such as the hard disk drive or display, may be powered off to save electricity. The computer often initiates suspend mode automatically when the computer has not detected action from the user for a predetermined period of time, such as keystrokes or mouse movements. Computer programs running during suspend mode typically run normally, however, and the computer wakes up the suspended devices as needed. For instance, the computer monitor may turn off or darken the if no user activity is detected for a predetermined period of time, in order to save power. If the user moves the mouse or presses a key on the keyboard, then the monitor turns back on. Similarly, the hard disk drive may spin down if no data has been read from or written to disk for a predetermined time. As soon as the user saves a file or opens a file or application program, the disk drive wakes up to handle the data transfer. Although the computer often requires a short delay to wake up suspended hardware components, the computer can save a great deal of power by suspending certain devices when they are not undergoing heavy use.

During sleep mode, nearly every device in the computer system, including the CPU, powers down; typically only the main memory and the I/O controller remain powered. As a result, computer activity ceases until the user brings the computer out of sleep mode, pressing the "power on" button. Because the main memory remains powered on during sleep mode, the memory contents are preserved so that the computer returns to the same state that it was in when the sleep mode began. Sleep mode can begin automatically, usually after the computer detects no user activity for a long time, or can begin in response to command from the user. Although sleep mode offers less functionally than the suspend mode, in fact rendering the computer temporarily unusable, the sleep mode also requires relatively little power and provides a high level of battery conservation that is especially desirable in portable systems.

Early implementations of the various power modes required the computer hardware itself to monitor user activity and determine the proper power state for each device in the computer system. More recently, the Advanced Configuration and Power Interface (ACPI) specification written by Intel, Microsoft, and Toshiba has introduced the concept of managing power functions using the computer operating system. Centralizing power management within software, in contrast with the original method of hardware-based power management, allows computer manufacturers to make simpler, less expensive hardware components that do not have to manage their own power states. Instead, these devices need only to respond to power management commands from the operating system. In addition, software-based power management permits the computer system implement highly complex power management procedures that may have been difficult, if not impossible, to realize using the more decentralized hardware-based approach of the past. Software-based power management also advantageously provides the user with some level power management control.

Taking advantage of the various power modes, more recent computer designs have incorporated a "warm docking" procedure in which the computer is placed in sleep mode during the docking sequence. Because entering sleep mode causes the expansion bus to power down, the computer can be connected to the docking station during sleep mode. In one implementation, the docking station includes a docking pin which makes contact with any computer that is placed into the dock. The docking pin connects electrically to the I/O controller within the computer, providing a sideband docking signal, as illustrated in FIG. 1. Accordingly, when the user places the computer 100 into the dock 150, contact with the docking pin asserts a "docking" interrupt to the processor, to notify the processor that the docking sequence is beginning. In response, the processor places the computer into sleep mode, effectively deactivating the expansion bus and sideband signals. The I/O controller may remain awake during sleep mode, however, to monitor the docking signal. The docking station 150 includes a mechanical hook for securing the computer 100. After the computer enters sleep mode, the docking station 150 grabs the computer 100 via the mechanical hook and pulls the computer 100 into the dock 150. Because the expansion bus and sideband signals are powered down during sleep mode, no electrical transient problems occur during warm docking. The docking station 150 then transmits another interrupt signal via the docking pin to notify the processor that the docking procedure has completed, and the computer 100 responds by returning to full-power mode.

A major problem with warm docking is that it can require a significant amount of time to return to full-power mode in some systems. Most computers require a relatively long time to power up, initialize, and enumerate various components, for instance. In particular, hard disk drives must undergo a rather lengthy wakeup period that requires extensive re-calibration. Consequently, warm docking can be too time-consuming for some users.

More recently, "hot docking" procedures have been developed that permit docking while the computer system is fully powered. In one implementation, the computer system and docking station incorporate a special docking safe circuit 135 coupled to the expansion buses. Upon detecting that a docking sequence has been initiated, the docking safe circuit 135 drives the expansion bus 125 to a docking safe state. In the docking safe state, the ground conductors of the expansion bus 125 are referenced to a common ground potential, the bus 125 is placed in a "quiet," or non-transitioning, state, all bidirectional terminals of the docking station bus 175 are set to an input state, and the signaling levels of the buses 125 and 175 have the same voltage potential. A major disadvantage to this hot docking procedure is that it requires providing the specialized docking safe circuitry 135 in the computer system. Due to the increasing demands by consumers to reduce the cost, size, and power consumption of computer systems, it is generally desirable to keep the number of components within computer systems to a minimum. The docking safe circuitry thus represents cost, size, and power burdens to the manufacturer.

In addition to the operational difficulties of hot docking, the docking connectors must accommodate as many as 52 connector pins in some cases, depending on the specific features implemented by the bus. A typical PCI bus may implement cache support, ACPI support, JTAG support, parity, interrupts, and other features, for example, requiring the full array of pins. In addition, the docking signal as well as various sideband signals run between the computer and dock, further increasing the number of pins in the docking connector. Such a large number of pins requires a physically large connector, making it relatively difficult to establish a tight connection between the docking connector and the dock. Lack of a solid connection may result in a variety of problems, including excessive signal attenuation. A large docking connector also requires a large cutout on the computer chassis, reducing the structural integrity of the chassis.

Additionally, the large number of signals that an expansion bus carries introduces troublesome and often unpredictable problems with electromagnetic interference (EMI). All electrical wires emit small levels of electromagnetic radiation which can interfere with neighboring wires and with electronic components and cables which are close by. Accordingly, all commercial electronic devices must meet strict EMI emission guidelines which require costly design, testing procedures, and materials. In addition, docking buses currently are susceptible to receiving electromagnetic interference.

For the foregoing reasons, a computer system capable of performing hot docking without the need for special docking safe circuitry would simplify and expedite the docking procedure without incurring the added costs of extraneous circuitry. Such an apparatus, if devised, should permit transient-free coupling of expansion bus signals and should transfer sideband signals between the computer and docking station during normal computer operation. Such an apparatus also should facilitate a tight coupling between the computer and the dock, should generate minimal levels of EMI without requiring expensive countermeasures, and should effectively block outside EMI. Despite the apparent advantages that such a system would provide, to date, no such device provides these features.

SUMMARY OF THE INVENTION

Accordingly, a preferred embodiment of the present invention discloses a computer system and associated docking station, each comprising a separate docking bridge. Each docking bridge comprises an interface to an expansion bus, such as a PCI bus, and an interface to a hot pluggable bus, which preferably comprises an IEEE 1394 serial bus. The expansion bus interface within the computer system couples to the computer system PCI bus, and the expansion bus interface within the dock couples to the docking station PCI bus. Each docking bridge also receives sideband signals to be transferred between the computer and the dock. An IEEE 1394 bus connects between the two docking bridges to carry PCI and sideband signals from the computer to the dock and from the dock to the computer. The pair of docking bridges thus transfer data between the computer and docking station such that, together, the docking bridges appear to function as a single PCI-to-PCI (or "P2P") bridge. Thus, each docking bridge preferably implements standard PCI features such as providing ACPI configuration space and acting in both master and slave configurations.

Because the IEEE 1394 bus is hot pluggable, no docking safe circuitry is required, and the docking connection can be made during normal system operation without causing harmful bus transients on either PCI bus. Further, the PCI bus and sideband signals are transmitted over the same wires, reducing the number of signals running between the dock and the computer. In addition, the serial nature of the IEEE 1394 bus requires a relatively small number of signals, reducing the size of the docking connector and thus strengthening the chassis and enabling a firm docking connection. The use of differential signaling on IEEE 1394 bus also reduces the effects of EMI, including both EMI generated and EMI received by the docking connection.

During certain PCI bus cycles, the docking bridge within the computer system captures the values of the PCI bus signals within the computer, encapsulates the values into a serial bus packet, and transfers the values serially to the docking bridge within the expansion base. The docking bridge within the computer system includes a signal type field in each of the serial bus packets that identifies the contents of the packet as PCI signals. The docking bridge within the expansion base decodes the signal type field to verify that the packet includes PCI signals, extracts the PCI signal values from the packet, and drives the PCI bus within the dock using the PCI bus values captured in the computer. Similarly, the docking bridge within the docking station captures selected PCI bus cycles and transmits the captured bus values to the computer system. The docking station encloses the signals within a serial bus packet that includes a signal type field identifying the contents of the packet as PCI signals. The computer system, upon determining from the signal type field that the packet includes PCI signals, extracts the PCI signal values from the packet and drives the PCI bus within the computer using the received PCI bus values.

Similarly, the computer and docking station exchange sideband signals over the IEEE 1394 bus. The computer system may receive sideband signals from various internal components, including a CPU, a south bridge device, an I/O controller, and a peripheral device coupled to one of the expansion buses. The docking station may receive sidebands from the south bridge device or from any other device. The docking bridge within the computer system samples the values of sideband signals received from components within the computer, encapsulates the captured values in IEEE 1394 packets, and transmits the values to the docking station. Each packet carrying sideband signal values includes a signal type field identifying the packet as containing sideband signal values. The docking station determines that the packets contain sideband signals and drives the corresponding sideband signals within the dock. Similarly, the docking bridge within the docking station captures sideband signals received from components within the dock, encapsulates the captured values in IEEE 1394 packets, and transmits the packets to the computer along with the appropriate signal type field. The computer, upon decoding the signal type field to determine the contents of the packet, drives the associated sideband signals within the computer.

Each docking bridge comprises PCI bus interface, a signal encoder that transmits and receives sideband signals, and a packetizer that assembles and disassembles serial bus packets. The signal encoder captures received sideband signals and also receives captured control signals from the expansion bus interface. Address and data buffers are disposed between the PCI bus interface and the packetizer for storing address and data signals traveling both to and from the PCI bus. The packetizer couples to a serializer, which converts the packet data to and from serial format for transmission over the serial bus, and a parser controls operation of the packetizer and serializer. A serial bus driver, coupled to the serializer, provides a physical interface to the IEEE 1394 bus.

The expansion bus interface captures PCI bus values during selected PCI bus cycles and transfers captured address values to the address buffer, captured data values to the data buffer, and captured control values to the encoder. Upon receiving captured PCI values, the encoder creates a signal type field identifying the captured signals as PCI signals. The packetizer then combines the signal type field with the PCI control, address, and data signals into a serial bus packet and loads the packet into the serializer. The serializer provides one bit at a time to the IEEE 1394 driver, which transmits the bits over the serial bus.

Similarly, the IEEE 1394 driver receives serial data transmitted over the IEEE 1394 bus. Each received bit is supplied to the serializer, which temporarily stores the incoming serial stream and then loads the data in parallel to the packetizer. If the signal type field indicates that the packet contains PCI values, the packetizer loads the address and data signals into the address and data buffers and the control values into the encoder. The PCI interface retrieves the control, address, and data values from the encoder, address buffer, and data buffer, and drives the PCI bus with the received values. If the signal type field indicates that the packet contains sideband signals, then the packetizer loads the sideband signals into the encoder, which drives the sideband signals to the proper states.

Thus, the present invention comprises a combination of features and advantages that enable it to substantially advance the art by providing a hot dockable computer system and expansion base including a pair of docking bridges that perform the duties of a conventional docking bridge but without the drawbacks associated with prior art devices. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

A better understanding of the present invention can be obtained when the following detailed description of the preferred embodiment is considered in conjunction with the following drawings, in which:

FIG. 3 illustrates the block diagram of a preferred embodiment of the docking bridge of FIG. 2;

FIG. 4A illustrates a flowchart of the procedure for transmitting captured signals from the docking bridge of FIG. 2.

DETAILED DESCRIPTION OF PREFERRED EMBODIMENTS

Figure 2:
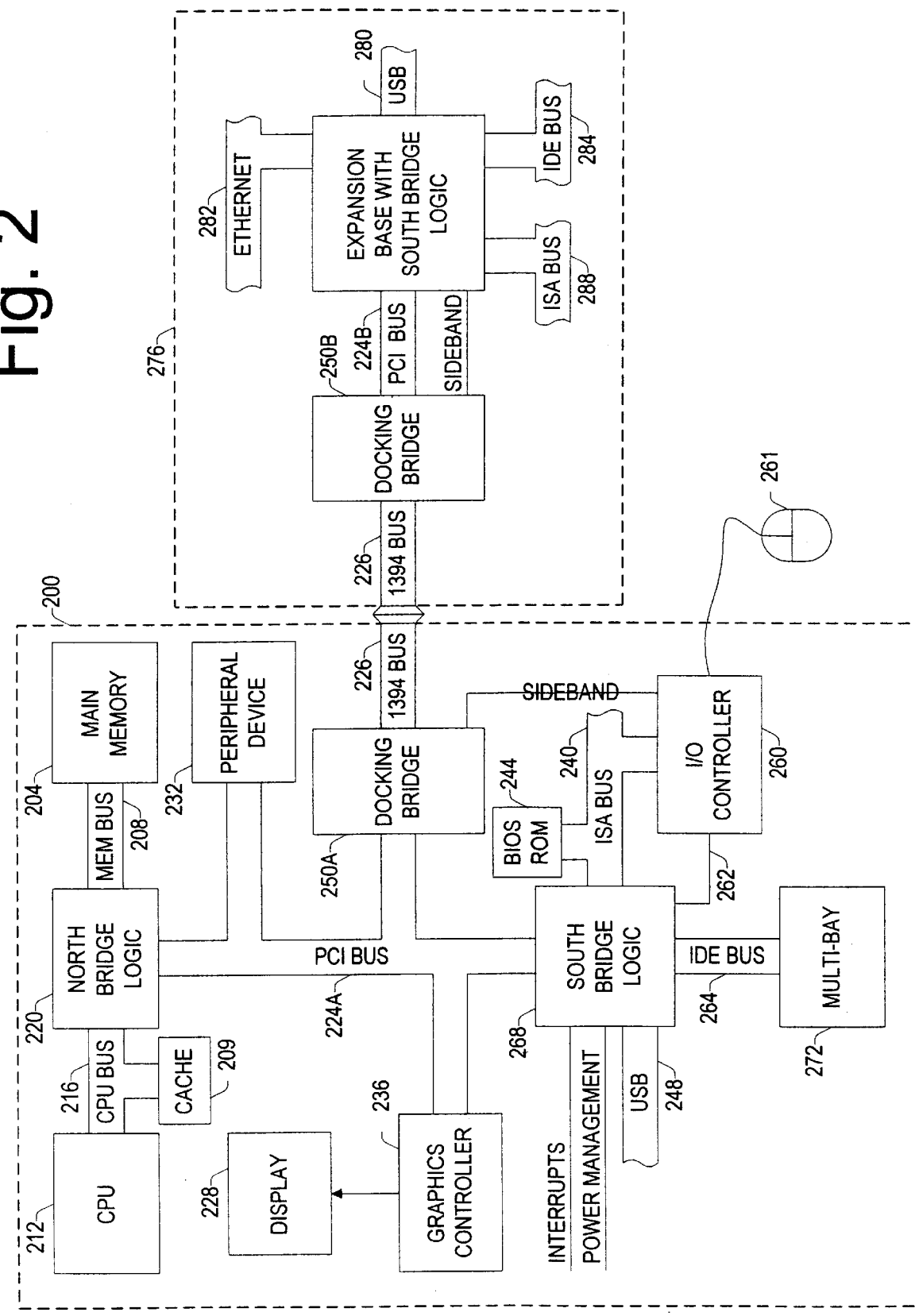
FIG. 2 illustrates the block diagram of a portable computer system constructed in accordance with a preferred embodiment and coupled to a docking station.

FIG. 2 illustrates a computer system 200 constructed in accordance with a preferred embodiment and coupled to a docking station 276. Although shown as coupled, thus depicting docked operation, the computer system 200 and expansion base 276 may be decoupled, or "undocked," as will be described below.

Computer system 200 generally includes a processor or CPU 212 coupled to a main memory array 204 and a variety of other peripheral computer system components through an integrated North bridge logic device 220. The bridge logic device 104 is sometimes referred to as a "North bridge" for no other reason than it often is depicted at the upper end of a computer system drawing. The CPU 212 preferably couples to bridge logic 220 via a CPU bus 216, or the bridge logic 220 may be integrated into the CPU 212. The CPU 212 may comprise, for example, a Pentium® III microprocessor. It should be understood, however, that computer system 200 could include other alternative types of microprocessors. Further, an embodiment of computer system 200 may include multiple processors, with each processor coupled through the CPU bus 216 to the bridge logic unit 220.

The main memory array 204 preferably couples to the bridge logic unit 220 through a memory bus 208, and the bridge logic 220 preferably includes a memory control unit (not shown) that controls transactions to the main memory 204 by asserting the necessary control signals during memory accesses. The main memory 204 functions as the working memory for the CPU 212 and generally includes a conventional memory device or array of memory devices in which program instructions and data are stored. The main memory array may comprise any suitable type of memory such as dynamic random access memory (DRAM) or any of the various types of DRAM devices such as synchronous DRAM (SDRAM), extended data output DRAM (EDO DRAM), or Rambus™ DRAM (RDRAM).

The computer system 200 also preferably includes a graphics controller 236 that couples to the bridge logic 220 via an expansion bus 224A. As shown in FIG. 2, the expansion bus 224A comprises a Peripheral Component Interconnect (PCI) bus. Alternatively, the graphics controller 236 may couple to bridge logic 220 through an additional Advanced Graphics Port (AGP) bus (not specifically shown). As one skilled in the art will understand, the graphics controller 236 controls the rendering of text and images on a display device 228. The graphics controller 236 may embody a typical graphics accelerator generally known in the art to render three-dimensional data structures on display 228. These data structures can be effectively shifted into and out of main memory 204 via the expansion bus and bridge logic 220. The graphics controller 236 therefore may be a master of the expansion bus (including either PCI or AGP bus) enabling the graphics controller 236 to request and receive access to a target interface within the bridge logic unit 220, including the memory control unit. This mastership capability permits the graphics controller 236 to access main memory 204 without the assistance of the CPU 212. A dedicated graphics bus accommodates rapid retrieval of data from main memory 204. As will be apparent to one skilled in the art, the bridge logic 220 includes a PCI interface to permit master cycles to be transmitted and received by bridge logic 220. If an AGP bus is included in the system, the bridge logic 220 also includes an interface for initiating and receiving cycles to and from components on the AGP bus. The display 228 comprises any suitable electronic display device upon which an image or text can be represented. A suitable display device may include, for example, a cathode ray tube (CRT), a liquid crystal display (LCD), a thin film transistor (TFT), a virtual retinal display (VRD), or any other type of suitable display device for a computer system.

In the preferred embodiment as shown in FIG. 2, the expansion bus 224A comprises a Peripheral Component Interconnect (PCI) bus. Computer system 200, however, is not limited to any particular type of expansion bus, and thus various buses may be used, including a high speed (66 MHz or faster) PCI bus. In the preferred embodiment, a plurality of PCI peripheral devices may reside on the PCI bus 224A. The PCI devices may include any of a variety of peripheral devices such as, for example, network interface cards (NIC's), video accelerators, audio cards, hard or floppy disk drives, Personal Computer Memory Card International Association (PCMCIA) drives, Small Computer Systems Interface (SCSI) adapters and telephony cards. Although only one PCI peripheral device 232 is depicted in FIG. 2, it should be recognized that computer system 200 may include any number of PCI devices as desired.

The following discussion describes the preferred embodiment of computer system 200 for a laptop computer that can be connected to an expansion base 276 via the PCI bus. This should not be construed as limiting the present invention to a laptop. The present invention also may be used with a desktop system, work station, server, or handheld computer. In addition and as mentioned above, computer system 200 can be implemented with respect to the particular bus architectures shown in FIG. 2 (i.e., PCI bus), or other bus architectures (i.e., IEEE 1394), as desired. The embodiment described herein, however, assumes that the expansion base are implemented using PCI buses, as shown in FIG. 2, and thus the following discussion will focus on configuring the present invention for that embodiment. Further, CPU 212 preferably comprises a Pentium® III processor and thus CPU bus 216 represents a Pentium® III bus. These bus protocols and the terminology used with respect to these protocols are well known to those of ordinary skill in the art. For a more thorough understanding of the PCI, or Pentium® III bus, refer to the *PCI Local Bus Specification* (1993) and *Intel P6 External Bus Specification*. If an AGP bus also is used in the computer system, reference may be made to the *Accelerated Graphics Port Interface Specification* (Intel, 1996).

Referring still to FIG. 2, a South bridge logic device 268 preferably connects to expansion bus 224A. The South bridge 268 couples or "bridges" the primary expansion bus 224A to other secondary expansion buses. These other secondary expansion buses may include an ISA (Industry Standard Architecture) bus, a sub-ISA bus, a USB (Universal Serial Bus), an IDE bus, an IEEE 1394 standard (or "Firewire") bus, or any of a variety of other buses that are available or may become available in the future. In the preferred embodiment of FIG. 2, the South bridge logic 268 couples to a sub-ISA bus 240, a USB bus 248, and an IDE bus 264. As will be apparent to one skilled in this art, various peripheral devices may be coupled to each of these buses. Thus, as shown in the preferred embodiment of FIG. 2, an I/O controller chip 260 connects to the sub-ISA bus 240, as do a BIOS ROM 244 and various other ISA-compatible devices (not specifically shown).

Similarly, according to the preferred embodiment, a multi-bay configuration 272 couples to the IDE bus 264 and to the I/O controller 260. The I/O controller 260 preferably interfaces various input devices, including a mouse 261 and a keyboard (not shown). The multi-bay configuration preferably includes three independent bays connected in any master/slave, primary/secondary configuration supporting hot-plugging of IDE devices in the bays. As one skilled in the art will understand, various IDE devices are available including CD ROM drives, floppy drives, tape drives, and the like. The USB 248 supports various peripherals, especially video peripherals such as video cameras for teleconferencing purposes. In addition to the buses discussed above, the South bridge 268 also preferably connects to interrupt signal lines, power management signal lines, and serial bus 262.

As noted above, the computer system 200 preferably comprises a laptop computer. To facilitate use of the computer system 200 within a traditional desktop environment, an expansion base 276 preferably is available for connecting the laptop computer system to additional peripheral devices and to a computer network via an Ethernet bus. The expansion base 276 may include any type of configuration, including a port replicator or docking station. The present embodiment envisions, however, that the expansion base 276 also includes a South bridge logic (not shown specifically) for coupling components on the PCI bus 224A to other components coupled to the expansion base. Thus, as shown in FIG. 2, a South bridge logic device within the expansion base 276 couples the PCI bus 224B to various expansion buses including an ISA bus 288, USB 280, and IDE bus 284.

Figure 1:
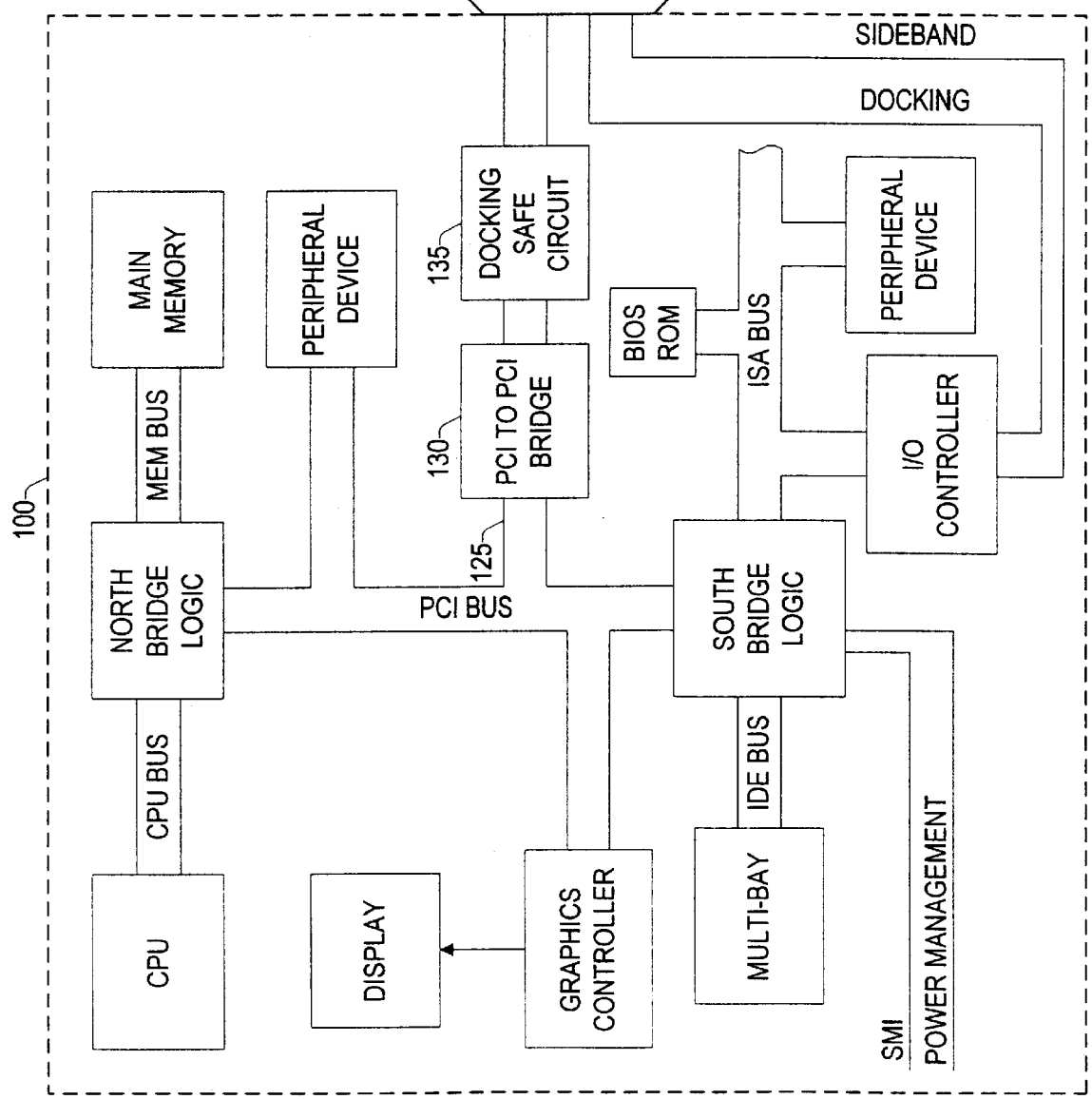
FIG. 1 illustrates the block diagram of a conventional laptop computer system and docking station configuration.

Computer system 200 also includes a docking bridge 250A for coupling the computer PCI bus 224A to the expansion base 276. Expansion base 276 includes a docking bridge 250B constructed in substantially the same manner as bridge 250A. During normal docked computer operation, an IEEE 1394 bus 226 couples the two docking bridges 250A–B. The IEEE 1394 bus 226 comprises two segments, one segment inside the computer 200 and another segment inside the expansion base 276. As shown in FIG. 2, the bus segments are physically and electrically coupled through a connector and thus form a single bus. When coupled via the IEEE 1394 bus 226, the docking bridges 250A–B function in substantially the same manner as would a single P2P bridge connecting the buses 224A–B (e.g., the PCI bridge 130 in FIG. 1), albeit without the need for docking safe circuitry. Accordingly, the docking bridges 250A–B transfer PCI cycles between buses 224A–B and carry sideband signals between the computer 200 and dock 276 in real time. The IEEE 1394 bus 226 operates using only four signals, dramatically reducing the number of signals required by prior art docking connectors. As a result, the docking connector requires fewer pins, permitting a tight docking connection and a small connector cutout on the chassis. The IEEE 1394 bus also emits less electromagnetic interference than most other buses, through the use of differential signaling techniques.

Note that one of the bridges 250 may be omitted, either in the computer or the docking station, if desired. For example, if the computer system 200 implements an IEEE 1394 bus architecture instead of a PCI bus architecture, then the docking bridge 250A within the computer may be omitted, and the docking bridge 250B within the expansion base connected directly to the IEEE 1394 bus within the computer 200. Similarly, if the expansion base 276 implements an IEEE 1394 bus architecture instead of a PCI bus architecture, then the docking bridge 250B within the expansion base may be omitted, and the docking bridge 250A within the computer connected directly to the IEEE 1394 bus within the expansion base 276. A preferred embodiment, however, contemplates two PCI-to 1394 docking bridges 250A–B as shown in FIG. 2, one bridge 250A interfacing the PCI bus 224A in the computer and one bridge 250B interfacing the PCI bus 224B in the dock 276.

In accordance with standard docking bridge protocol, one of the two PCI buses supported by the docking bridges is designated as the "primary" bus and the other bus as the "subordinate" bus. Accordingly, the primary bus operates as the "main" PCI bus of the computer system, while the subordinate bus operates as an "expansion" PCI bus to extend the functionality of the primary PCI bus. In a preferred embodiment, the PCI bus 224A represents the primary PCI bus and the dock PCI bus 224B represents the subordinate PCI bus, although either bus 224B or bus 224A could function as master or subordinate if desired.

Referring still to FIG. 2, in addition to supporting normal PCI transactions, the IEEE 1394 bus 226 permits the docking bridges 250A–B to exchange various sideband signals, eliminating the need to physically connect sideband signal wires between the computer 200 and docking station 276. In computer system 200, the sideband signals are shown as transmitted between the I/O controller 260 and the docking bridge 250A. Likewise, the sideband signals in the expansion base are shown coupled to the expansion base south bridge logic. Note, however, that the sideband signals may originate or terminate at any components within the computer 200 and docking station. For instance, docking signals may run between the docking bridge 250A and the CPU 212, the south bridge 268, and/or a peripheral device 232. If desired, the sideband signals may include a docking signal to indicate docking status..

The IEEE 1394 standard specifies that an IEEE 1394 bus comprises six wires: two twisted pair cables (a total of four wires), and two power wires. The power wires permit IEEE 1394 devices to deliver power to other devices on the IEEE 1394 bus. The first twisted pair is called the "data" signal, and the second twisted pair is called the "strobe" signal. In a preferred embodiment, the bus 226 comprises a single IEEE 1394 cable with only the data and strobe signals, using four of the six available wires. Thus, the docking station 276 provides its own power under a preferred embodiment. In an alternative embodiment, the docking station 276 and computer system 200 may connect using all six wires, so that either the computer 200 or dock 276 receives power over the IEEE 1394 bus 226. The docking station 276, for example, may provide power to the computer system 200 over the IEEE 1394 bus 226 to eliminate the need to attach a power cable to the computer 200 while docked. Similarly, the computer system 200 may provide power to the expansion base 276 over the bus 226, if desired.

Each twisted signal pair carries a differential signal, which means that each member of the pair carries a voltage that is equal in magnitude but opposite in sign to the other member of the pair. Accordingly, if one wire in a twisted pair carries 1 volt, then the other wire will carry −1 volt. For this reason, each member of a differential pair tends to generate EMI that is equal and opposite from the EMI generated by the other member of the pair, resulting in nearly total cancellation of EMI. Thus, IEEE 1394 buses maintain a low level of EMI and thus tend not to interfere with neighboring devices.

The IEEE 1394 protocol specifies using two signal pairs to implement nonreturn to zero (NRZ) signaling. Under the NRZ scheme, the data signal carries the value of the data being transmitted. If a data bit represents a logic "high" value, then the data signal carries a logic "high" value. Conversely, if a data bit represents a logic "low" value, then the data signal carries a logic "low" value. Thus, the data signal does not change values between bits that have the same value. The strobe signal, on the other hand, toggles its voltage value during every bit that has the value as the previous bit and maintains its value if the data bit changes. Accordingly, either the data signal or strobe signal changes value during every bit. The data and strobe signals may be combined through combinatorial logic (e.g., an XOR logic gate) to recover the timing of the transmitted signal.

As shown, the IEEE 1394 bus 226 may comprise a distinct IEEE 1394 cable, may represent a pair of IEEE 1394 connectors coupled to each other and terminated at the docking bridges 250A–B, or may comprise any desired set of wires or other connection that implements the IEEE 1394 physical interface. When coupled via the IEEE 1394 bus 226, the docking bridges 250A–B generally facilitate transactions between the two PCI buses 224A and 224B. Because the IEEE 1394 standard permits hot plugging, the IEEE 1394 bus 226 connection may be terminated at any time to end docked operation. Accordingly, the computer system 200 may connect to the docking station during normal operation, eliminating the need for the computer system 100 to transition into a low-power state such as suspend or sleep mode during the docking sequence. Note that although bus 226 may comprise any desired bus architecture, including a parallel or serial bus, the IEEE 1394 architecture is particularly suited for coupling the PCI buses 224A–B for numerous reasons, including hot plugging, high bit rate, small number of signals (and thus connector pins), and reduced EMI. The bus 226 also may be implemented using an array of buses carrying data simultaneously. Two buses operating at the same time, for example, could provide approximately twice the throughput of a single bus 226.

During selected PCI bus cycles, the docking bridges 250A–B capture the data signal values from the attached PCI buses 224A–B, convert the data values into a serialized bitstream, and transmit the bitstream across the IEEE 1394 bus 226. Upon receiving bitstream data over the serial bus 226, each docking bridge 250 assembles the bitstream into an array of bus signal values and drives the PCI bus 224 with these values. The docking bridges 250 transmit the sideband signal values over the serial bus 226 in substantially the same manner. Each bridge detects the states of the incoming sideband signals and transmits these states to the other bridge across the serial bus 226. Upon receiving the value of a sideband signal over the serial bus 226, each bridge 250 drives the appropriate sideband signal with the received value.

After capturing the state of the PCI bus 224 or a sideband signal, each docking bridge 250 preferably encapsulates the data values into one or more packets to be transmitted over the IEEE 1394 bus 226. The IEEE 1394 standard defines various packet formats that may be used over a IEEE 1394 bus. Typical IEEE 1394 packets comprise a header, for example, which may include an address corresponding to the packet sender, an address corresponding to the packet recipient, and a transaction code (or "t-code") that identifies the packet contents. One purpose of including the sender and recipient addresses, however, is to permit communication among a plurality of devices which share a common bus. In a preferred embodiment with only two bus nodes (i.e., the docking bridges 250A–B), the sender and recipient are implied, so those fields may be neglected. In addition, any or all of the standard header fields may be omitted as desired. Instead, the header field preferably includes a single code identifying the packet contents, similarly to the t-code currently used under 1394. The code may be any desired length, from one bit to multiple bits, as necessary to define the different packet types. The header field may identify the contents of the packet, for example, as a packet containing a particular set of PCI signals or as the value of one or more sideband signals. If desired, special header codes may be assigned to identify control messages that can be passed between the bridges 250A–B.

In addition to a packet header and the data, each packet preferably includes an error detection field that permits the receiving bridge 250 to detect bit errors which occurred during transmission. The error detection field preferably comprises a single "parity" bit but may include any number of bits which are calculated according to any desired technique. A parity bit indicates whether there are an even or odd number of "high" logic values in the packet. Under the "even parity" scheme, the parity bit is set to logic high if the packet includes an even number of data bits, or the parity bit is set to logic low if the packet contains an odd number of data bits. In a preferred embodiment, however, an "odd parity" scheme is used, under which a high parity bit indicates an odd number of high data values, and a low parity bit indicates an even number of parity bits. The transmitter sets the parity bit by counting the number of high data values in the packet. Upon receiving the packet, the receiver counts the number of high data values received and verifies that the parity bit matches. If a bit is inverted to the wrong value during transit, the receiver will detect that an error occurred because the parity bit does not match the data. Note that any other error detection/correction scheme, ranging from a complex channel coding scheme to even no scheme at all, may be implemented without departing from the principles of this disclosure.

FIG. 3 illustrates a docking bridge 250 constructed in accordance with a preferred embodiment. For purposes of this disclosure, docking bridge 250 represents the general structure and operation of each of the bridges 250A–B in FIG. 2. Note, however, that the bridges 250A–B may comprise separate and distinct devices and, therefore, incorporate different and unique features as desired. As depicted in FIG. 3, a PCI bus 224, an IEEE 1394 bus 226, and various sideband signals connect to docking bridge 250. Docking bridge 250 comprises an interface 300 to the PCI bus 224, a encoder 304 coupled to the PCI interface 300, and address buffers 308 and data buffers 312 that receive and store PCI addresses and data, respectively, through the PCI interface 300. The encoder 304 also receives the sideband signals. Along with the address and data buffers 308 and 312, the encoder 304 couples to a packetizer 316, which in turn couples to a serializer/deserializer 324 and a parser 320. The docking bridge 250 further includes an IEEE 1394 driver 328 coupling the serializer/deserializer 324 to the IEEE 1394 bus 226.

PCI interface 300 transmits and receives various PCI control, address, and data signals on the bus 224 according to the PCI bus protocol. Accordingly, the PCI interface 300 preferably conforms to the principles and PCI bus protocols taught in standard PCI bus reference manuals published by the PCI Special Interest Group, the organization that develops and governs the PCI protocol. Further, the docking bridge 250 preferably is capable of acting as a master of the PCI bus or as a slave. Publications that describe how to implement a standard PCI interface include the *PCI Specification, Rev.* 2.0, the *Mobile Design Guide*, and the *Power Management Specification* 1.1, all published by the PCI Special Interest Group. The principles taught in these documents are well known to those of ordinary skill in the art and are herein incorporated by reference. Future versions of these documents may be used as well. If bus 224 comprises another type of bus, such as an EISA bus or a conventional parallel bus, for example, then the interface logic 300 may be designed to handle the resulting protocol and does not have to implement a PCI bus interface.

PCI interface 300 preferably includes PCI configuration space, an arrangement through which the CPU 212 can manage the PCI buses 250A–B and various PCI devices. PCI management activities include, for example, detecting (or "enumerating") buses and bus devices and incorporating these components into overall system operation, establishing bus arbitration parameters (e.g., assigning memory addresses and input/output ports to various components), and implementing power management protocols such as ACPI. When computer system begins operation (or "boots"), the CPU 212 enumerates and establishes arbitration for the internal PCI bus 224A. If the docking station 276 is connected during the boot sequence, then the CPU 212 also enumerates and establishes arbitration for the docking station PCI bus 224B and any devices coupled thereto. If the docking station 276 is first connected during computer operation, then the CPU 212 handles enumeration and arbitration for the bus 224B upon establishing the connection. The configuration space may be implemented using dedicated or general purpose registers residing in the PCI interface or through any other circuitry. In a preferred embodiment, docking bridge 250A transfers configuration cycles to the docking bridge 250B in the docking station 276, allowing the CPU 212 to enumerate and control devices within the docking station 276.

During normal operation, the PCI interface 300 preferably captures the state of each PCI bus signal (excluding static signals such as power and ground) during each bus cycle in which the PCI interface 300 does not drive the PCI bus 224. The PCI interface 300 supplies the captured PCI control signals to the encoder 304, the PCI address signals to the address buffer 308, and the PCI data signals to the data buffer 312. In alternative embodiments, the PCI interface 300 may capture only selected bus cycles and/or selected signals instead of capturing every state during every bus cycle. The PCI interface 300 also drives the PCI bus 224 with control, address, and data signals received from the encoder 304, address buffer 308, and data buffer 312. The encoder 304 preferably notifies the PCI interface 300 if PCI signals to be transferred to the PCI bus 224 are pending in the bridge 250. In response, the PCI interface 300 arbitrates for access to drive the PCI bus 224 and transfers the pending cycles upon receiving bus access. Alternatively, the PCI interface 300 may poll the encoder 304 periodically to check for serial bus-to-PCI cycles received from the packetizer 316. The PCI interface 300 then transfers any pending serial bus-to-PCI cycles onto the PCI bus 224.

PCI interface 300 generally includes a PCI interface master control unit (not shown) that is configured to initiate transactions on PCI bus 224 to transmit cycles received over the serial bus 226. When a request to read or write data to PCI bus 224 is received by the PCI interface master control unit, the PCI interface master control unit arbitrates for the PCI bus 224 and initiates a transaction on PCI bus 224. Address, byte enable, transaction type description, and data (for write transactions) are passed to the PCI interface master control unit to run the proper cycle on PCI bus 224. The PCI interface master control unit may multiplex either the lower or upper four byte enables to PCI bus 224 depending on the asserted byte enables. If all the byte enables are asserted, PCI interface master control unit may convert the quadword transfer into a burst of two doublewords on PCI bus 224 (since the PCI bus has a data width of 32-bits). It is noted that PCI interface master control unit may further support write combining of sequential write data from the CPU bus 216.

PCI interface 300 further includes a slave interface (not shown) which accepts transactions targeted for the docking bridge 250. When the FRAME_signal is asserted on PCI bus 224, indicating the start of a PCI transaction, the address of the transaction is stored within the PCI slave interface, which also receives command information from PCI bus 224 indicating the type of cycle being run. The slave interface is configured to decode the command and address information to determine if the transaction is targeted to the docking bridge 250 and asserts the DEVSEL_signal to claim the cycle, when appropriate.

Similarly, the IEEE 1394 driver 328 transmits and receives various control, address, and data signals on the serial bus 226 according to the IEEE 1394 bus protocol. Accordingly, the bus driver 328 preferably conforms to the principles and protocols taught in standard IEEE 1394 bus reference manuals published by the Institute for Electrical and Electronics Engineers (IEEE) IEEE 1394 standard. In particular, the IEEE 1394 driver implements the physical (PHY) layer of the IEEE 1394 bus interface, which implements such functions as bus arbitration, encoding/decoding (e.g., NRZ encoding), and bus initialization. The principles taught in these documents are well known to those of ordinary skill in the art and are herein incorporated by reference. Future versions of these documents may be used as well. If the serial bus 226 comprises another type of bus, such as Fibre Channel bus, for example, then the bus driver 328 may be designed to handle the resulting protocol and does not have to implement a IEEE 1394 bus interface. Although the bus driver 328 may implement other standard IEEE 1394 layers, such as the "link" and "transaction" layers, the bridge 250 preferably does not adhere to these layers as taught by the IEEE 1394 specification, but instead implements custom link and transaction layers.

The address buffer 308 and data buffer 312 store addresses and data, respectively, associated with PCI bus cycles. The PCI interface 300 transmits captured addresses to the address buffer 308 and places captured data signals into the data buffer 312. The captured address and data values then wait in the buffers 308 and 312 to be dequeued by the packetizer 316 the address and data buffers 308 and 312, the packetizer 316 stores addresses and data which are associated with PCI cycles received from the serial bus 226. The PCI interface 300 drives PCI bus signals based on the address and data values in the address and data buffers 308 and 312.

The encoder 304 generally comprises an array of buffers (not specifically shown), which store incoming and outgoing data, and a control logic (not specifically shown), that controls access to the buffers, drives selected sideband signals, and encodes and decodes PCI control signals and sideband signals traveling to and from the serial bus 226. Upon receiving control signals captured from the PCI bus 224, the encoder 304 generates a translation code that describes the states of the signals. As will be discussed in greater detail below, the translation code is eventually transmitted over the serial bus 226 and decoded by the other bridge 250. The other bridge 250 then drives its PCI bus according to the signal values embedded in the translation code. Similarly, the encoder 304 converts incoming sideband signals, into a translation code that encodes the states of the sideband signals. The encoder 304 also decodes encoded sideband signals received from the serial bus 226. After decoding received sideband signals, the encoder 304 energizes the associated sideband signals to the proper states. Similarly, the encoder 304 notifies the PCI bus interface 300 after decoding a set of received PCI control signals. The PCI interface 300 responds by requesting access to the PCI bus 224 and running a PCI cycle using the decoded control signals.

The encoder 304 may encode and decode sideband signals and PCI control signals in any desired manner, although a preferred embodiment contemplates that the encoding will indicate (1) which signal(s) are included in the translation code and (2) the states of the signals included in the translation code. If desired, the translation code may be formatted as an IEEE 1394 packet header. In a preferred embodiment, the translation code comprises a signal type field and a signal value field. The signal type field identifies the packet contents, indicating, for example, whether the translation code represents PCI control signals or sideband signals. The signal value field defines the values of the encoded signals. Accordingly, each bit of the signal field encodes the state of one signal, so that the number of bits in the signal value field equals the number of encoded signals. In a preferred embodiment, a one-bit signal type field is implemented, whereby a zero indicates that the translation code is carrying PCI bus signals and a one indicates that the translation code is carrying sideband signals. The length of the signal type field can be any desired size, however, and may be omitted if desired. For example, if a data packet contains the entire array of PCI signals and sideband signals, the signal type field may be neglected.

In an alternative embodiment, the signal type field may comprise two or more bits to represent four or more different signal combinations. A two-bit embodiment, for instance, might be used to represent up to four different signal combinations. As an example, a "00" signal type field indicates that the translation code is carrying PCI bus signals; a "01" signal type field indicates that the translation code is carrying a first group of sideband signals; and a "10"

signal type field indicates that the translation code is carrying a second group of sideband signals. The "11" translation code may be used for a third group of sideband signals, for example, or for a combination of sideband and PCI control signals. In another embodiment, the translation code may contain private communications between the bridges, such as configuration messages. Accordingly, the signal value field may contain the message, and the signal type field may contain a special translation code for messaging.

The packetizer 304 assembles and disassembles packets traveling between the PCI bus 224 and serial bus 226. The packetizer 316 generally comprises an array of memory buffers and a control logic (not specifically shown) that controls the general operation of the packetizer 316, although the specific architecture of the packetizer 316 may be designed in any desired manner. Upon creating a translation code, the encoder 304 notifies the packetizer 316 that a group of signals is ready to be packetized for transmission over the serial bus 226. In response to the notification, the packetizer 316 retrieves the translation code from the encoder 304. Alternatively, the encoder 304 may transmit the translation code along with the notification.

If the translation code denotes a PCI cycle, then the packetizer 316 creates a serial bus packet that includes the translation code (stored in the encoder 304) and the PCI address and data values (stored in the address and data buffers 308 and 312). If the encoder 304 has already formatted the translation code as a packet header, then the packetizer 316 creates a data field for the packet that includes the contents of the address and data buffers 308 and 312. In accordance with the IEEE 1394 protocol, the data field may be padded with zeroes if necessary to ensure that its length is an integral multiple of 32 bits. The packetizer 316 then concatenates the translation code with the data field to form the packet. If the encoder 304 has not already formatted the translation code as a packet header, then the packetizer 316 creates a header in accordance with the serial bus protocol. In a preferred embodiment, the packet header includes the signal type field (the portion of the translation code that identifies the packet as a PCI cycle), and the packet data field comprises the signal value field (the portion of the translation code that contains the states of the PCI control signals). The packet data field also includes the states of the PCI address and data signals, which are stored in the address and data buffers 308 and 312. If desired, the PCI control, address, and/or data signals may be transmitted as part of the packet header.

If the signal type field of the translation code denotes one or more sideband signals, then the packetizer 316 can create the packet entirely from the translation code. If the encoder 304 has already formatted the translation code as a packet header, then the translation code becomes the packet itself. If the encoder 304 has not already formatted the translation code as a packet header, then the packetizer 316 creates a header in accordance with the serial bus protocol. In a preferred embodiment, the packet header includes the signal type field (the portion of the translation code that identifies the contents of the packet as sideband signals), and the packet data field comprises the signal value field (the portion of the translation code that contains the states of the sideband signals). In accordance with the IEEE 1394 protocol, the data field may be zero-padded to a length that is an integral multiple of 32 bits. If desired, the signal value field may reside in the packet header, eliminating the need to include a data field in the packet.

In addition to creating data packets for the serial bus 226, the packetizer 316 also decomposes packets received from the serial bus 226. The decomposition procedure generally comprises the packetizing procedure in reverse. Under a preferred embodiment, the incoming packet header includes the signal type field that defines whether the packet contains PCI signal values or sideband signal values. If the packet contains sideband signal values, then the packetizer 316 transmits the signal type field and the signal value field to the encoder 304, in the form of a translation code. If the packet contains a PCI cycle, then the packetizer 316 also transmits the PCI address to the address buffer 308 and the PCI data values to the data buffer 312. As explained above, the packet data field holds the PCI address and data values, in a preferred embodiment, although these values may be embedded in the packet header under some embodiments. If necessary, the packetizer 316 removes trailing zeroes from the data field.

The serializer 324 generally comprises an array of input and output registers (not shown) for converting between the serial data stream of the IEEE 1394 driver 328 and the parallel data stream of the packetizer 316. The registers preferably are cascaded serially so that the data can be clocked to and from the serial bus driver 328, one bit at a time. The registers may be arranged in any desired fashion, however. In one embodiment, for example, the registers do not interconnect serially but instead couple to a multiplexer/demultiplexer that selects one register at a time. In a preferred embodiment, the packetizer accesses the input and output registers in parallel, which generally involves reading or writing to two or more registers during each operation. In a preferred embodiment, the packetizer 316 accesses all of the input registers or all of the output registers at once, although the registers may be loaded or unloaded one at a time or in groups, if desired.

The parser 320 generally regulates the flow of data between the packetizer 316 and serializer/deserializer 324 which converts outgoing parallel data from the computer to serial format (serializer) for transmission over the 1394 bus 226 and incoming serial data from the 1394 bus 226 to a parallel format for use by the computer (deserializer). When the serial bus driver 328 finishes loading data from the bus 226 into the serializer/deserializer, the parser 320 causes the packetizer 316 to retrieve the data from the serializer registers. If the serializer/deserializer 324 does not include enough input registers to hold an entire serial bus packet, then the parser 320 ensures that the packetizer 316 unloads the input registers in a timely fashion to ensure that the serializer/deserializer 324 can receive additional data from the IEEE 1394 driver 328. Similarly, the parser 320 monitors the packetizer 316 to determine when a packet is ready to be transmitted onto the serial bus 226. The parser 320 then cues the packetizer 316 to load the serializer 324 with the packet bits. If desired, the parser 320 may clock data in and out of the serializer 324 to the serial bus driver 328 or may perform other control and monitoring operations within the bridge 250.

FIG. 4A illustrates a flowchart of the procedure for transmitting packets containing PCI and/or sideband signals over the IEEE 1394 bus 226, either from the computer 200 to the dock 276, or from the dock 276 to the computer 200. As shown in block 400, if the packet is to contain PCI signals, then the PCI interface 300, in block 404, captures the state of the PCI bus 224. In block 408, the PCI interface 300 stores the control signal values into the encoder 304, the address signal values into the address buffer 308, and the data signal values into the data buffer 312. Next, if the packet is to contain sideband signals (block 412), or if the packet does not contain PCI signals (block 400), then the encoder 304 captures the states of the desired incoming sideband signals in block 416. In block 424, the encoder 304 generates a signal type field that identifies whether the packet includes PCI signals and/or sideband signals. The signal type field, in block 428, is combined with the signal values into a translation code. The translation code is then passed to the packetizer 316 in block 432.

The packetizer 316 handles the translation code depending on the value of the signal type field. If the signal type field indicates that the translation code includes PCI signals (block 436), then the packetizer 316 loads the PCI address and data signals from the address buffer 308 and data buffer 312 in block 440. Next, in block 444, the packetizer 316 creates a IEEE 1394 packet, which includes the translation code. If the signal type field denotes PCI signals, then the packet also includes the PCI address and data signals in addition to the PCI control signals, which preferably are embedded within the signal value field of the translation code. Next, in block 448, the packetizer 316 loads the packet into the serializer/deserializer 324, which sends the packet serially to the IEEE 1394 driver in block 452. In block 456, the IEEE 1394 driver transmits the packet bits over the bus 226.

Figure 4B:
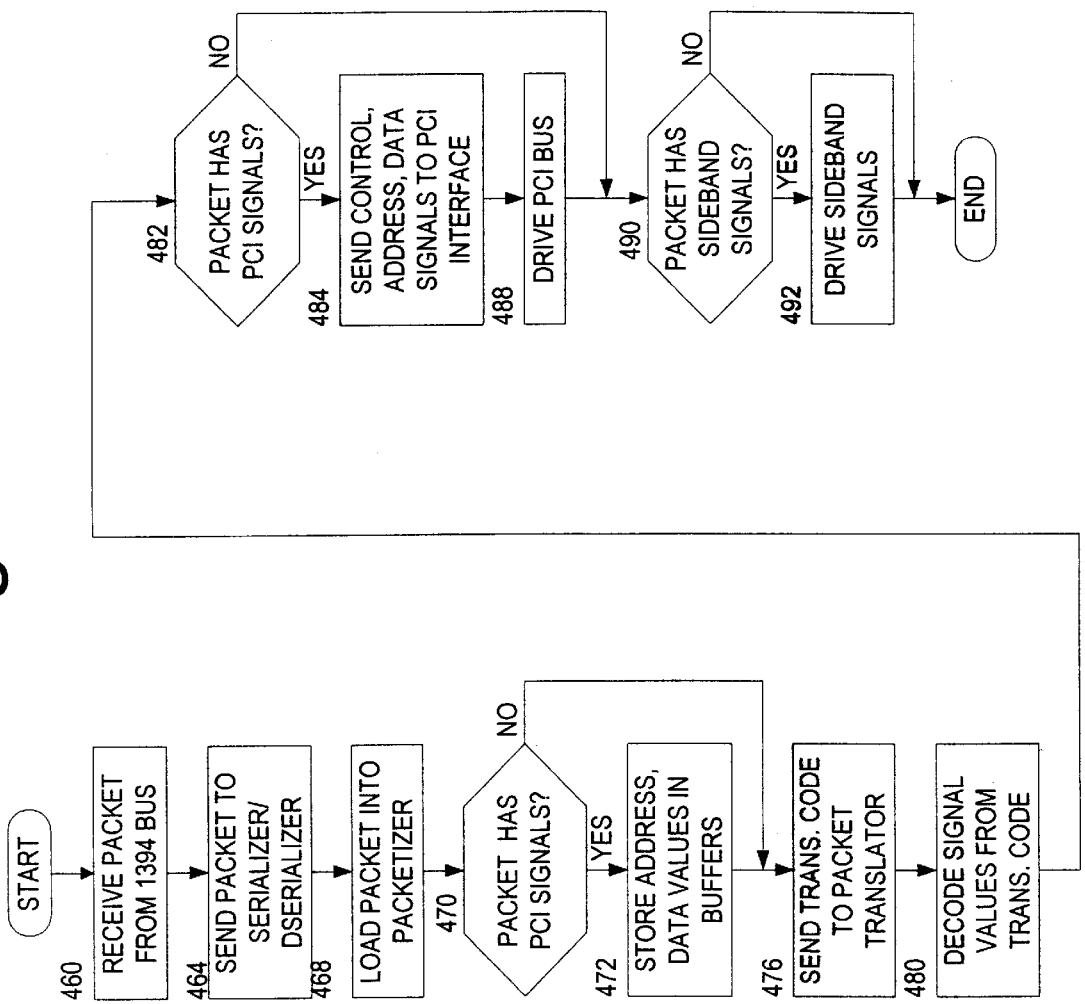
FIG. 4B illustrates a flowchart of the procedure for receiving captured signals in the docking bridge of FIG. 2.

FIG. 4B illustrates a flowchart of the procedure for receiving PCI data cycles over the IEEE 1394 bus 226, either in the computer 200 or the dock 276. Beginning with block 460, the IEEE 1394 driver 328 receives data over the IEEE 1394 bus 226, one bit at a time. In block 464, the IEEE 1394 driver 328 loads the incoming packet into the serializer/deserializer 324, and the packetizer 316, in block 468, loads the bits from the serializer/deserializer 324. If the packet contains PCI signals (block 470), as indicated by the signal type field of the translation code, then the packetizer 316 extracts the PCI data and address signal values from the packet and stores these values into the address buffer 308 and data buffer 312 in block 472. In block 476, the packetizer 316 sends the translation code to the encoder 304.

The encoder 304 processes the translation code to separate the signal type field from the signal value field in block 480. If the signal type field indicates that the signal value field includes PCI signals (block 482), then the encoder 304 sends the PCI control signals to the PCI interface 300. The PCI interface 300 also loads the PCI address and data signals from the address buffer 308 and data buffer 312 in block 484, and in block 488, drives the PCI bus with the PCI control, address, and data signals. If the packet includes sideband signals, as indicated by the signal type field of the translation code in block 490, then the encoder 304 energizes the appropriate sideband signals to the values indicated by the signal value field in block 492. Note that although the flowchart of FIG. 4B illustrates driving the PCI bus before transmitting the sideband signals, the sideband signals may be transmitted prior to the PCI signals or simultaneously with the PCI signals.

Accordingly, this disclosure provides an apparatus and method to perform hot docking without the need for special docking safe circuitry which simplifies and expedites the docking procedure. The docking bridges successfully perform the required duties of a conventional P2P bridge without incurring the penalties associated with prior P2P bridges. Because the IEEE 1394 bus is hot pluggable, no docking safe circuitry is required, and the docking connection can be made during normal system operation without causing harmful bus transients on either PCI bus. Further, the PCI bus and sideband signals are transmitted over the same wires, reducing the number of signals running between the dock and the computer. In addition, the serial nature of the IEEE 1394 bus requires a relatively small number of signals, reducing the size of the docking connector and thus strengthening the chassis and enabling a firm docking connection. The use of differential signaling on IEEE 1394 bus also reduces the effects of EMI, including both EMI generated and EMI received by the docking connection.

Numerous variations and modifications will become apparent to those skilled in the art once the above disclosure is fully appreciated. It is intended that the following claims be interpreted to embrace all such variations and modifications.

I claim:

1. A computer system, comprising:
   a processor;
   a memory array coupled to said processor;
   a primary expansion bus coupled to said processor and said memory array; and
   a bus bridge coupled to said expansion bus, said bus bridge comprising:
      a primary bus interface that transmits and receives data over said primary expansion bus; and
      a secondary bus interface coupled to said primary bus interface and configured to transmit and receive data over a hot pluggable secondary expansion bus, wherein said bus bridge captures the values of signals on said primary expansion bus and transmits the captured bus values through said secondary bus interface;
   wherein said bus bridge receives primary expansion bus values through said secondary bus interface and drives said primary expansion bus with the received bus values;
   wherein said secondary expansion bus comprises a serial bus;
   said computer system also including a peripheral device coupled to said expansion bus and a sideband signal coupling said peripheral device to said bus bridge, wherein said bus bridge captures the value of the sideband signal and transmits the captured sideband value through said serial bus;
   wherein said bus bridge also receives a sideband value through said serial bus interface and drives the sideband signal with the received sideband value; and
   wherein said bus bridge includes a packetizer coupled to said primary and secondary bus interfaces, wherein said packetizer creates outgoing data packets that carry captured signals transmitted through said serial bus interface.

2. The computer system of claim 1, wherein said packetizer extracts received signal values from incoming bus packets received through said serial bus interface.

3. The computer system of claim 1, wherein said bus bridge further includes an encoder that creates a signal type field for each outgoing data packet created by said packetizer, wherein the signal type field indicates whether the associated packet carries the values of primary expansion bus signals.

4. The computer system of claim 3, wherein said encoder determines whether an incoming data packet carries primary expansion bus values.

5. The computer system of claim 3, wherein the signal type field indicates whether the associated packet carries the value of the sideband signal.

6. The computer system of claim 5, wherein said encoder determines whether an incoming data packet carries a sideband signal value.

7. A computer system, comprising:

a processor;

an input device operatively coupled to said processor;

a main memory coupled to said processor;

a first expansion bus coupled to said processor and said main memory;

a first docking bridge coupled to said expansion bus;

a docking station, including a second expansion bus and a second docking bridge coupling said second expansion bus to said first expansion bus via said first docking bridge; and a hot pluggable serial bus coupling said first docking bridge to said second docking bridge;

wherein said first docking bridge captures the values of signals on the first expansion bus and transfers the captured values to said second docking bridge, and wherein said second docking bridge drives the second expansion bus with the values captured from said first expansion bus;

wherein said second docking bridge captures the values of signals on the second expansion bus and transfers the captured values to said first docking bridge, and wherein said first docking bridge drives the first expansion bus with the values captured from said second expansion bus;

said computer system further includes a first peripheral device coupled to said first docking bridge via a first outgoing sideband signal and a second peripheral device coupled to said second docking bridge via a first incoming sideband signal, wherein said first docking bridge captures the value of the first outgoing sideband signal and transmits the captured first sideband value to said second docking bridge, wherein said second docking bridge drives the first incoming sideband signal with the captured first sideband value; and a second outgoing sideband signal coupling said first peripheral device to said first docking bridge, and including a second incoming signal coupling said second peripheral device to said second docking bridge, wherein said second docking bridge captures the value of the second outgoing sideband signal and transmits the captured second sideband value to said first docking bridge, wherein said first docking bridge drives the second incoming sideband signal with the captured second sideband value;

wherein said first docking bridge and said second docking bridge each comprises:

an expansion bus interface that transmits and receives data over an expansion bus;

a packetizer coupled to said expansion bus interface and that creates serial bus packets which carry expansion bus signals and sideband signals over said serial bus;

an encoder that creates a data field identifying the contents of outgoing data packets, wherein said packetizer includes the data field in each serial bus packet; and a serial bus interface that transmits and receives packets over said serial bus.

8. The computer system of claim 7, wherein said packetizer disassembles incoming packets received over said serial bus to extract expansion bus signals and sideband signals enclosed in the packets.

9. The computer system of claim 8, wherein said encoder captures and drives the values of sideband signal coupled to each docking bridge.

10. A docking bridge for interfacing a computer system and an expansion base, comprising:

an expansion bus interface configured to transmit and receive data over an expansion bus and to capture the values of expansion bus signals;

an encoder configured to capture sideband signals running between the computer and expansion base and that receives captured expansion bus values from said expansion bus interface;

a packetizer coupled to said encoder and that creates data packets containing captured signal values in said encoder; and a serial bus driver coupled to said packetizer and configured to transmit and receive data packets over a serial bus.

11. The docking bridge of claim 10, wherein said serial bus driver comprises a driver for a hot pluggable bus.

12. The docking bridge of claim 11, wherein said serial bus driver comprises an IEEE 1394 bus driver.

13. The docking bridge of claim 11, wherein said encoder creates a signal type code that indicates whether a data packet comprises expansion bus values and that indicates whether a data packet comprises a sideband signal value.

14. The docking bridge of claim 13, wherein said packetizer inserts the signal type code into each data packet to identify the contents of the data packet.

15. The docking bridge of claim 14, wherein said packetizer extracts expansion bus signals and sideband signals from data packets received through said serial bus driver.

16. The docking bridge of claim 15, wherein said encoder interprets signal type codes in data packets received through said serial bus driver to determine if the packets contain expansion bus values.

17. The docking bridge of claim 15, wherein said encoder interprets signal type codes in data packets received through said serial bus driver to determine if the packets contain sideband signal values.

18. The docking bridge of claim 16, wherein said encoder transfers to said expansion bus interface the expansion bus values extracted from packets received through said serial bus driver, and wherein said expansion bus interface is configured to drive an expansion bus with values received from said encoder.

19. The docking bridge of claim 17, wherein said encoder is configured to drive sideband signals with sideband values extracted from packets received through said serial bus driver.

20. A computer system including an expansion base, comprising:

a processor;

a memory device coupled to said processor;

a bus interface coupled to said processor and that transmits and receives data over a first bus and that captures the values of signals from said first bus;

an encoder that captures sideband signals running between the computer and the expansion base and that receives the captured values from said bus interface;

a packetizer coupled to said encoder and that creates data packets containing captured signal values in said encoder; and a bus driver coupled to said packetizer and that transmits and receives data packets over a second bus.

21. The system of claim 20 wherein the bus driver comprises a driver for a hot pluggable bus.

22. The system of claim 20 wherein said second bus comprises a serial bus.

23. A docking bridge for interfacing a computer system and an expansion base, comprising:

a first bus interface configured to transmit and receive data over a first bus and to capture the values of signals from said first bus;

an encoder configured to capture sideband signals running between the computer and the expansion base and that receives the captured values from said first bus interface;

a packetizer coupled to said encoder and that creates data packets containing captured signal values in said encoder; and a bus driver coupled to said packetizer and configured to transmit and receive data packets over a second bus.

24. The docking bridge of claim 23 wherein said second bus comprises a serial bus.

25. The docking bridge of claim 23 wherein the bus driver comprises a driver for a hot pluggable bus.

\* \* \* \* \*